(12) United States Patent
Paschke et al.

(10) Patent No.: US 8,244,319 B2
(45) Date of Patent: Aug. 14, 2012

(54) SPLIT KEYBOARD WITH A DUAL BATTERY PACK

(75) Inventors: Brian Dennis Paschke, San Diego, CA (US); Glen Allen Oross, San Diego, CA (US); Cheri Ann Delacy, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 992 days.

(21) Appl. No.: 12/239,408

(22) Filed: Sep. 26, 2008

(65) Prior Publication Data

US 2010/0079938 A1    Apr. 1, 2010

(51) Int. Cl.
*H04M 1/00* (2006.01)
*H04M 9/00* (2006.01)
(52) U.S. Cl. .................. 455/575.4; 379/433.07
(58) Field of Classification Search .......... 455/575.1, 455/575.4, 575.8, 550.1, 90.1, 90.2, 90.3, 455/556.1; 379/433.01, 433.06, 433.07, 379/433.1, 433.11, 433.12, 433.13
See application file for complete search history.

(56) References Cited

U.S. PATENT DOCUMENTS

| | | | |
|---|---|---|---|
| 4,705,211 A * | 11/1987 | Honda et al. | 235/380 |
| 6,668,179 B2 | 12/2003 | Jiang | |
| 7,221,560 B2 | 5/2007 | Varela | |
| 7,697,270 B2 * | 4/2010 | Chen | 361/679.05 |
| 7,761,123 B2 * | 7/2010 | Hyun et al. | 455/575.1 |
| 2005/0054393 A1 | 3/2005 | Fagerstrom et al. | |
| 2006/0056141 A1 | 3/2006 | Pihlaja et al. | |

* cited by examiner

*Primary Examiner* — Eugene Yun (57) ABSTRACT

A balanced portable device that includes a rectangular housing, a rectangular display, and a split keyboard is described. The rectangular housing has a top face and a bottom face and the rectangular display is located on the top face. The split keyboard is configured to receive input that is shown on the rectangular display. The split keyboard includes a first retractable keyboard on a first end of the bottom face and the first keyboard includes a first battery. The split keyboard also includes a second retractable keyboard on an opposing end of the bottom face and the second keyboard also includes a second battery. The first retractable keyboard and the second retractable keyboard substantially weigh the same.

27 Claims, 4 Drawing Sheets

SPLIT KEYBOARD WITH A DUAL BATTERY PACK

FIELD OF THE INVENTION

This invention relates to a device and system having a split keyboard with a dual battery pack. More particularly, the invention relates to a portable device with a split keyboard with a dual battery pack, wherein each half of the split keyboard has a corresponding battery pack.

BACKGROUND

Wireless handsets have been enabled to perform the functions of computers, electronic organizers, pagers, personal digital assistants (PDAs). However, it has become increasingly challenging to provide them with user interfaces suited for entering text. Generally, wireless handsets support keyboard functions and a display screen on which a user can read text, surf the Web, prepare e-mails, view videos, and perform other such operations.

In general, users seem to be more comfortable with, and can enter more text using the familiar QWERTY keyboard. However, complete text keyboards are not easily integrated into a small device without making the keys too small. On the other hand, the larger the keyboard, the less area is available for the display screen and other features.

The mobile devices that come equipped with miniature text keyboards are generally designed to transmit and receive e-mail messages, text messages, or other text-based information. Sometimes the display screen and complete QWERTY keyboard share the same front face of the wireless handset, in which the display is on the top portion of the front face and the miniature QWERTY keyboard is on the bottom portion of the front face. Generally, a user types on the QWERTY keyboard using their thumbs in a manner similar to typing into a full-sized keyboard or a desktop computer.

Some wireless handsets only have a touch screen that lack a physical keyboard and also lack tactile feedback which is a major disadvantage compared to a miniature QWERTY keyboard. To overcome this problem, some touch screen handsets have a built in miniature QWERTY keyboard that are concealed in a first position and slide out in a second position that enables a user to interact with the QWERTY keyboard. Other touch screen handsets include a second position that requires the user to twist, flip, or rotate the QWERTY keyboard. These devices are clumsy to operate because the keyboard extends from the central body that is substantially heavier than the keyboard.

QWERTY keyboards may also be split. However, these split QWERTY keyboard arrangements provide a QWERTY keyboard device that is bulky and users find it awkward to use split QWERTY keyboards.

SUMMARY

A balanced portable device that includes a rectangular housing, a rectangular display, and a split keyboard is described. The rectangular housing has a top face and a bottom face and the rectangular display is located on the top face. The split keyboard is configured to receive input that is shown on the rectangular display. The split keyboard includes a first retractable keyboard on a first end of the bottom face and the first keyboard includes a first battery. The split keyboard also includes a second retractable keyboard on an opposing end of the bottom face and the second keyboard also includes a second battery. The first retractable keyboard and the second retractable keyboard substantially weigh the same.

In another illustrative embodiment, the balanced portable device further includes a first position, a second position and a spring. The first position is where the first retractable keyboard and the second retractable keyboard are disposed behind the rectangular display. In the second position, the first retractable keyboard and the second retractable keyboard extends beyond the display so that a plurality of first keys and second keys are accessible to the user. The spring that corresponds to each retractable keyboard includes a spring bias that is overcome to move each retractable keyboard from one position to another position.

In yet another embodiment, the portable device is a wireless device with a rectangular display that includes a touch screen display that is configured to operate in a landscape display mode and a portrait display mode. The first position corresponds to the portrait display mode, in which the first retractable keyboard and the second retractable keyboard are disposed behind the rectangular display. The second position corresponds to a landscape display mode, where the first retractable keyboard extends beyond the display so that a plurality of first keys are accessible and the second retractable keyboard extends beyond the display so that a plurality of second keys are also accessible.

DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the methods of operating the devices and wireless system described herein may vary as to details, order of the actions, or other variations without departing from the illustrative methods disclosed herein.

The device and systems provide a balanced split keyboard with a dual battery pack combination that has a balanced weight, structural integrity, and is intuitive to operate. The split keyboard is composed of two retractable keyboards that are associated with the bottom face or base portion of the portable device, wherein each retractable keyboard is held by one of the user's hands. Since each retractable keyboard houses a battery pack, a substantial portion of the wireless handset is held comfortably in each user's hand. Additionally, each of the retractable keyboards weighs substantially the same. The curved bottom face also makes it easier for the user's hand to grip or hold the associated retractable keyboard. When the retractable keyboards are drawn out, the retractable keyboard and combined battery pack of the portable device are held by the user's palm or fingers in a balanced manner that makes it easier for the user to control the key selection.

The portable device with the split keyboard described herein can be used for desktop applications such as typing, gaming, and web browsing. In the illustrative embodiments presented, the split keyboard is a split QWERTY keyboard associated with a wireless device that can be communicatively coupled to a carrier network.

Although the illustrative portable device presented herein is a wireless device, the split keyboard described herein can be also be used in a variety of portable devices. These portable devices include, but are not limited to, portable media players, portable video players, digital audio players, MP4 players, game controllers, video game console, personal computer, gamepad, joystick, gaming paddle, multi-mode wireless terminal, and other such portable devices.

In the illustrative embodiment, the portable device described herein operates within a carrier network, in which the users are typically subscribers of the carrier network or an affiliated carrier network. For purposes of this patent, the carrier network is more generally described as a wireless network service provider that manages or controls the operations of a wireless network or wireless communication system. The wireless network service provider may also be referred to as a carrier, operator, Internet Service Provider (ISP), Wireless Internet Service Provider (WISP), service provider, or other such terms. The wireless network service provider manages or controls the wireless network or wireless communication system.

Figure 1:
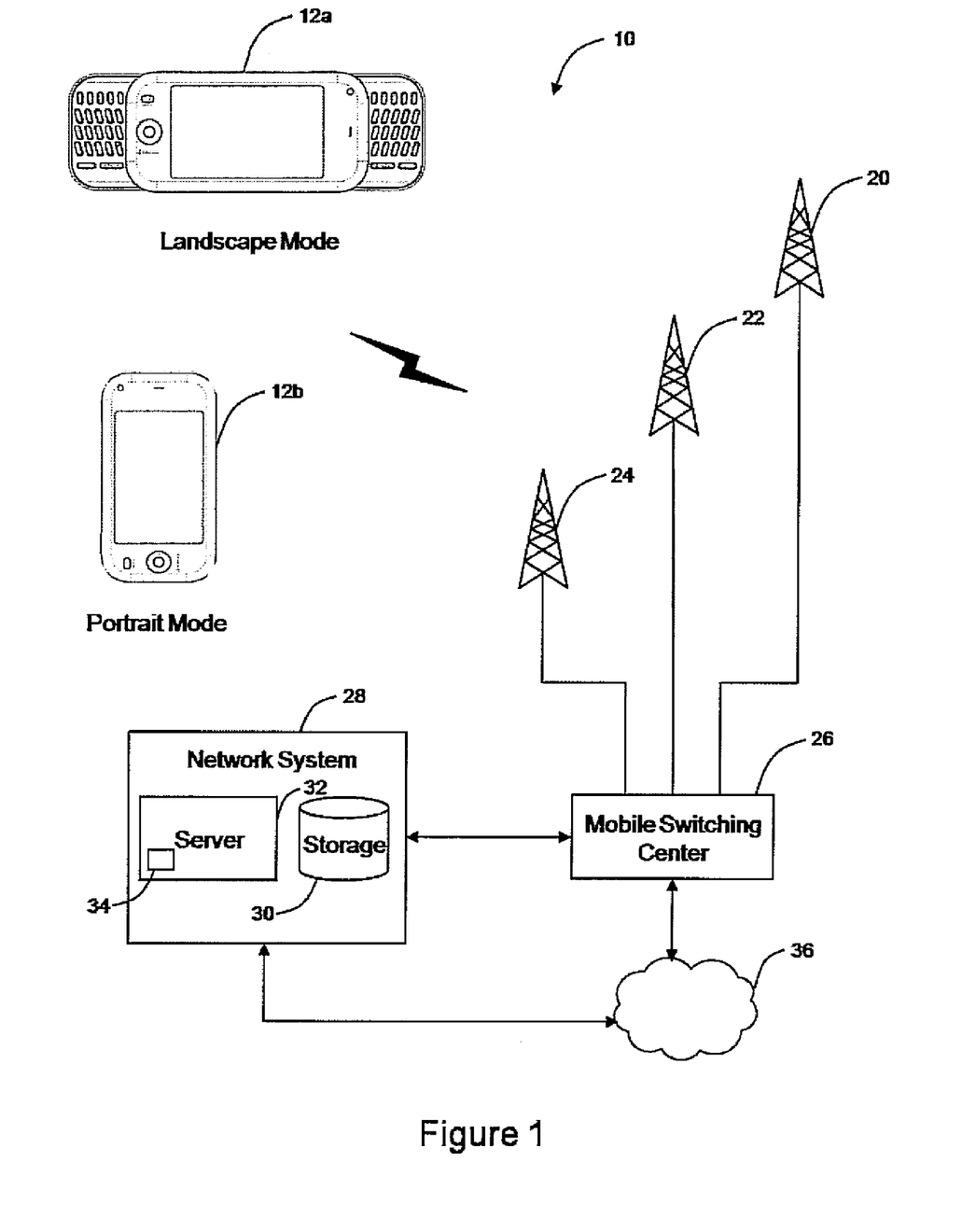
FIG. 1 shows an illustrative diagram of the balanced wireless device interacting with a system in both landscape display mode and portrait display mode.

Referring to FIG. 1 there is shown an illustrative diagram of the balanced wireless device interacting with a system 10 in either a landscape display mode or portrait display mode. The illustrative balanced wireless device 12 includes a rectangular touch screen display that is shown in landscape display mode 12a and in portrait display mode 12b. The landscape display mode 12a shows two retractable keyboards that can be used for typing text, watching videos, accessing locally stored files, or as a game controller as described herein.

In the illustrative embodiment, the display mode may affect the wireless device's communication with the wireless network. For example, in the portrait display mode 12b the wireless device may be configured to operate in voice mode where the illustrative touch screen display provides a graphical user interface with a numeric keypad that receives numeric input data. In another illustrative embodiment, the wireless handset operating a landscape display mode 12a may also operate in a voice mode and one of the retractable keyboards includes a plurality of numeric keys that receive a numeric input as described in further detail in FIG. 8. Additionally, the landscape display mode 12a is configured to operate in a video mode, in which audio visual media is shown on the display. When the wireless handset 12 is in video mode, it is configured to receive text messages and respond to text messages using the retractable keyboards, as well as voice calls and gaming data.

Each wireless handset 12 orientation is configured to communicate with one or more base stations 20, 22 and 24. The illustrative base stations 20, 22, and 24 may communicate with the illustrative wireless handsets 12 using a variety of different communication standards including, but not limited to, various forms of code division multiple access (CDMA) and time division multiple access (TDMA) wireless interfaces and other such communication standards. Alternatively, the base stations may also be referred to as access points, or any other such two-way radio installation in a fixed location that is used to communicate with a wireless handset.

The illustrative wireless handset 12 may be a mobile handset, mobile phone, mobile station, wireless phone, portable cell phone, cellular phone, portable phone, a personal digital assistant (PDA), or any type of mobile terminal which is regularly carried by a user and has all the elements necessary for operation in a wireless communication system. The wireless communication system includes, by way of example and not of limitation, CDMA, GSM or UMTS or any other wireless communication system such as wireless local area network (WLAN) or WiMAX. It shall be appreciated by those of ordinary skill in the art that the term wireless handset, mobile station, mobile handset, wireless phone, and mobile phone are interchangeable.

The illustrative wireless handset 12 is configured to communicate wirelessly with base stations 20, 22 and 24, which are operatively coupled to mobile switching center 26. The mobile switching center 26 is configured to communicate with network system 28 having a storage component 30 and a service management server 32.

The management server 32 manages a service, e.g. gaming, voice mail, electronic mail, and other such services. The illustrative management server 32 may be hosted by the wireless network service provider. The illustrative management server 32 also comprises a management module 34 that manages the software and firmware updates related to billing, granting temporary access to a particular service, notification, authentication, validation, testing, scheduling, status tracking, removal, termination of services, and other such operations. The mobile switching center 26 is also configured to communicate with a Wide Area Network (WAN) 36 represented by the network cloud. By way of example and not of limitation, the WAN 36 is the Internet.

Figure 2:
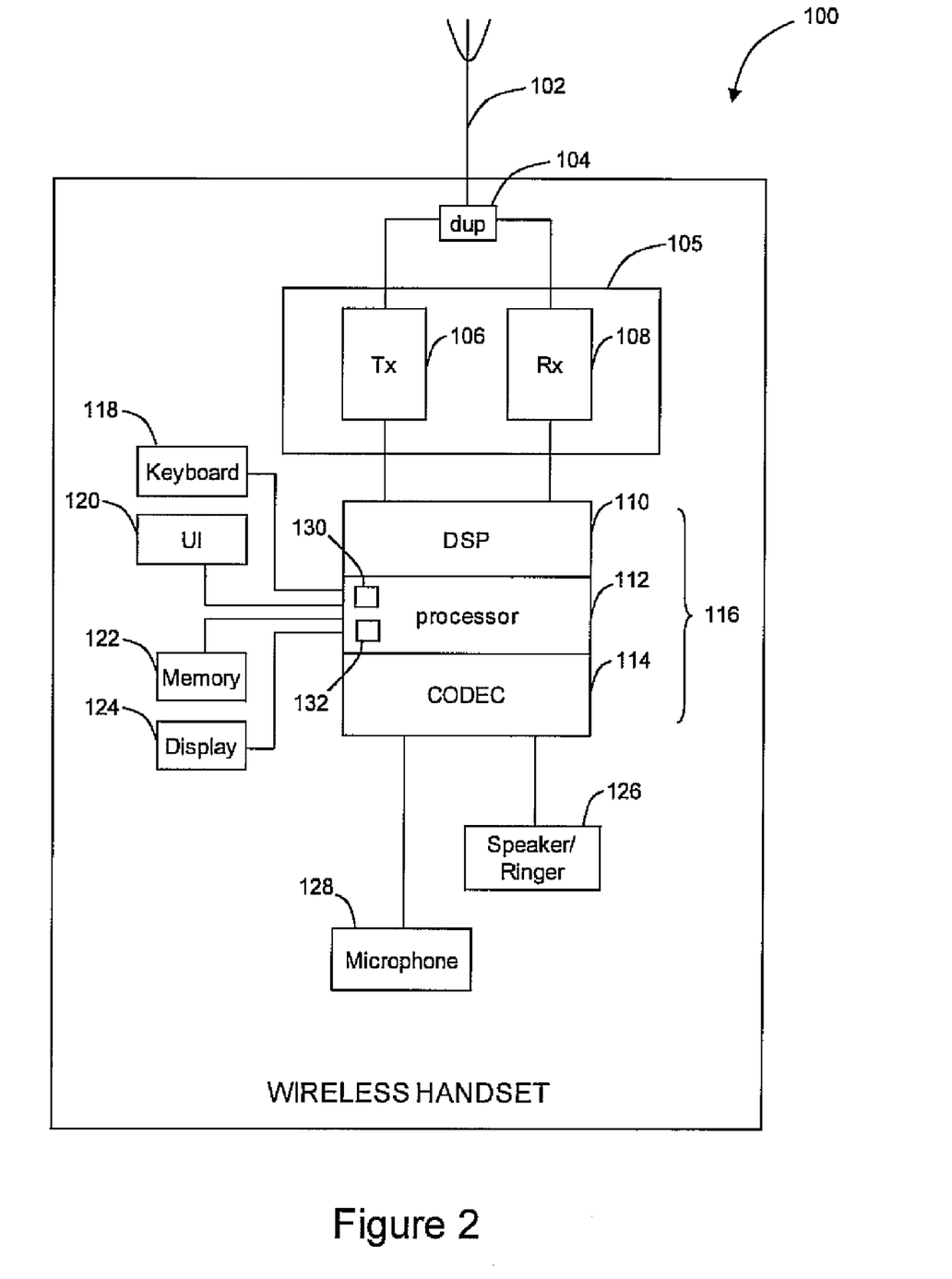
FIG. 2 shows a block diagram of the illustrative components of the wireless device.

Referring to FIG. 2 there is shown a block diagram of the illustrative components of the wireless device. The illustrative wireless handset 100 is configured to operate within the illustrative system 10 shown in FIG. 1 and referred to as wireless handset 12.

The illustrative wireless handset 100 comprises a first antenna element 102 that is operatively coupled to a duplexer 104, which is operatively coupled to transceiver 105 that includes transmitter 106 and receiver 108. An illustrative control module 116 comprises a digital signal processor (DSP) 110, a processor 112, and a CODEC 114 that are communicatively coupled to the transmitter 106 and receiver 108. The DSP 110 may be configured to perform a variety of operations such as controlling the antenna 102, transmitter 106, and receiver 108 operations. The processor 112 is operatively coupled to illustrative split QWERTY keyboard 118 described herein, a user interface (UI) 120, a memory 122, and an illustrative touch screen display 124. The memory 122 includes volatile memory, e.g. RAM, and nonvolatile memory, e.g. ROM.

Non-volatile memory is associated with non-volatile data structures. A non-volatile memory is computer memory that can retain the stored information even when not powered. Examples of non-volatile memory include read-only memory, flash memory, or any other such memory that retains its stored information through a power cycle. There are two kinds of non-volatile data structures, namely "variant" non-volatile data structures and "invariant" non-volatile data structures. These non-volatile data structures exist in the embedded file system (EFS) so they are preserved through a power cycle. Non-volatile data structures are associated with non-volatile items, which are components of a non-volatile file. By way of example and not of limitation, non-volatile items include a Mobile Directory Number (MDN), Home System Identification Code (Home-SID), Mode Preference, Roam Preference, Point-to-Point Protocol (PPP) User ID, PPP Password, Mobile IP, and other such non-volatile items that are associated with the non-volatile memory.

The processor 112 is also operatively coupled to the CODEC module 114 that performs the encoding and decoding operations and is communicative coupled to a speaker or ringer 126, and a microphone 128.

The illustrative wireless handset 100 may be built as a lightweight and small device adapted to be portable and may be conveniently carried around by a user. The wireless handset 100 is further adapted for caller operation and allows the user to interact with user interface (UI) 120 by manually inputting data with the split keyboard 118 such as described below that may additionally include specific input keys, such as a scrolling means or the like, to input particular information or to perform particular selection functions. Input data or requests may be taken from voice information that is received from microphone 124 or a combination of voice information and DTMF signals. Additionally, input data may be received from a touch screen display. The memory module 120 may be used for storing input data or storing programming information that is pre-loaded on the mobile handset 100, or that has been downloaded to the mobile handset 100.

In addition to the non-volatile memory and volatile memory 122, the processor 112 comprises a plurality of illustrative software modules or firmware, namely, a split keyboard module 130 and a touch screen display module 132.

The split keyboard module 130 is associated with a split QWERTY keyboard, and is configured to detect when the split QWERTY keyboard has been retracted. The touch screen display module 132 is configured to detect when the wireless device is in a landscape display mode 12a or in portrait display mode 12b. Generally, when the split QWERTY keyboard is drawn out and the keypads are exposed, the split keyboard module 130 communicates this status to the touch screen display module 132 thereby triggering the landscape display mode. Alternatively, when split QWERTY keyboard is retracted and the keypads are behind the rectangular display, the split keyboard module communicates this retracted status to the touch screen display module 132 that activates the portrait display mode.

The touch screen display module 132 may also determine whether to operate in the portrait display mode or the landscape display mode depending on the particular use of the wireless device 12. For example, if the wireless device is being used to watch a video, SMS, MMS, or for gaming purposes, then the default setting is landscape display mode.

Figure 3:
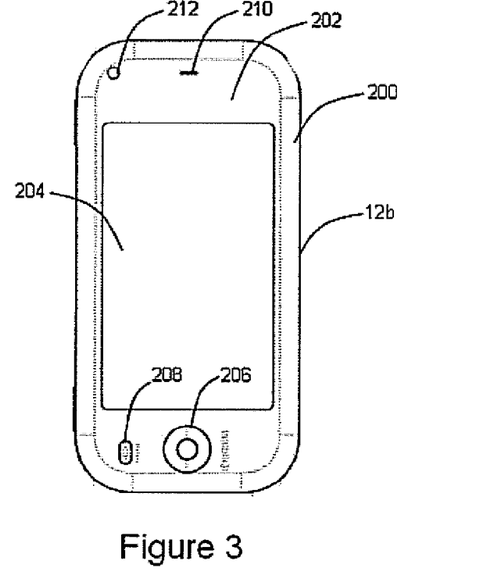
FIG. 3 presents a top view of the illustrative wireless device in a portrait display mode.

Referring to FIG. 3 there is shown a top view of the illustrative wireless device 12 in the portrait display mode 12b. The balanced wireless device 12 includes a rectangular housing 200 with a top face 202 that includes a rectangular display 204. The illustrative rectangular display 204 is a touch screen display. The top face also includes a navigation key 206 that is adjacent to the display 204 that is configured to move a cursor up, down, left and right. In the illustrative embodiment, the navigation key 206 is a five-way navigation key or button. Alternatively, the navigation key 206 may be a two-way key, four-way key, track wheel, jog dial, joy stick or other such navigation key that is suitable for controlling a cursor for a portable device.

The top face 202 also includes a menu button 208 that is configured to take the user directly to a menu page. By way of example and not of limitation, the menu page is a "home" page or "start" page from which the user can interact with a variety of different applications. Alternatively, the menu button 208 may be programmed by a user or carrier to provide access to pre-selected applications or services.

The top face 202 also includes a speaker behind the earpiece 210 that communicates sound to a user's ear. Additionally, the top face 202 includes a first camera 212 that may be used for video conferencing so that the user can see a live video feed of another person on the display 204, and the first camera 212 can communicate a video feed generated by the user interacting with the device 12.

Figure 4:
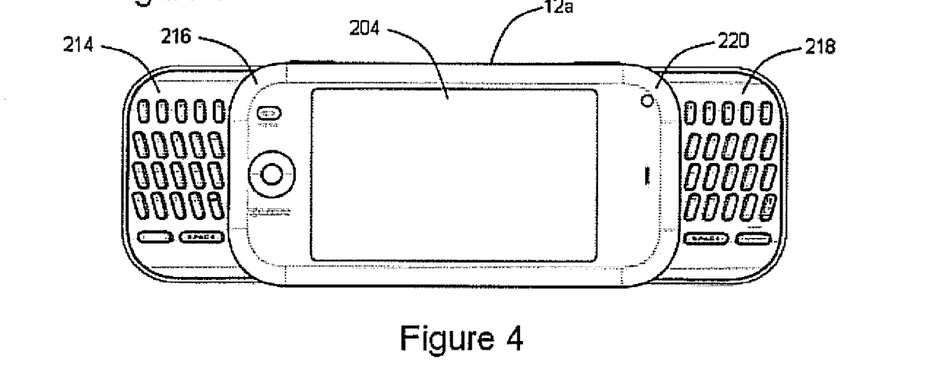
FIG. 4 shows a top view of the retractable split keyboard of the balanced wireless device in a landscape display mode.
Figure 5:
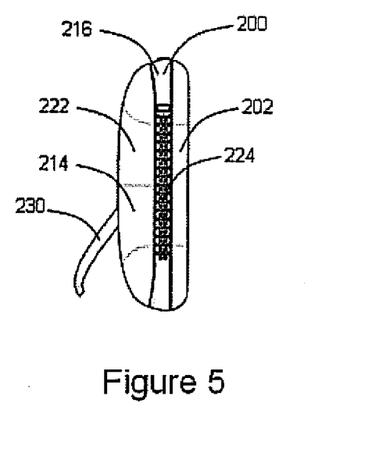
FIG. 5 shows a left side view of the illustrative wireless device.

Referring to FIG. 4 and FIG. 5 there is shown a top view and a side view, respectively, of the split keyboard of the balanced wireless device in a landscape display mode. In FIG. 4, the display 204 is in a landscape display mode 12a and the split QWERTY keyboard includes a withdrawn first retractable keyboard 214 at a first side end 216 and a withdrawn second retractable keyboard 218 at an opposing end 220. The two elements 214 and 218 of the split QWERTY keyboard are configured to receive input that is presented on the rectangular display. The input may be alphabetic, numeric, alphanumeric, symbols, or any other such input associated with a keyboard.

Referring now to FIG. 3 and FIG. 4, the balanced wireless device includes a first position and a second position, wherein the first position corresponds to the portrait display mode in FIG. 3 and the second position is associated with the landscape display mode in FIG. 4. The illustrative rectangular display 204 of the wireless device is a touch screen display that is configured to operate in the landscape display mode and the portrait display mode. In the first position (portrait display mode 12b), the first retractable keyboard 214 and the second retractable keyboard 218 are disposed behind the rectangular display 204. In the second position (landscape display mode 12a), the first retractable keyboard 214 and the second retractable keyboard 218 are drawn out and extend beyond the display 204 so that a plurality of first keys associated with the first retractable keyboard 214 and second keys corresponding to the second retractable keyboard 218 are accessible to the user.

In FIG. 5 a left side view of the illustrative wireless device is presented. The side view of the rectangular housing 200 shows the first side end 216 that includes the top face 202 and a bottom face 222 of the illustrative wireless device 12. The first retractable keyboard 214 and the second retractable keyboard 218 form the edges of the bottom face 222. Only a side view of the first retractable keyboard 214 is visible in FIG. 5. Additionally, a speaker cover 224 is associated with at least one speaker that is also located on the first side 216. In one embodiment, the illustrative speaker 224 is associated with the top face 202 and is fixedly coupled to the top face that also includes the rectangular display 204. In an alternative embodiment, the illustrative speaker 224 is associated with the bottom face 222 and slidably moves with the corresponding first retractable keyboard 214.

Figure 6:
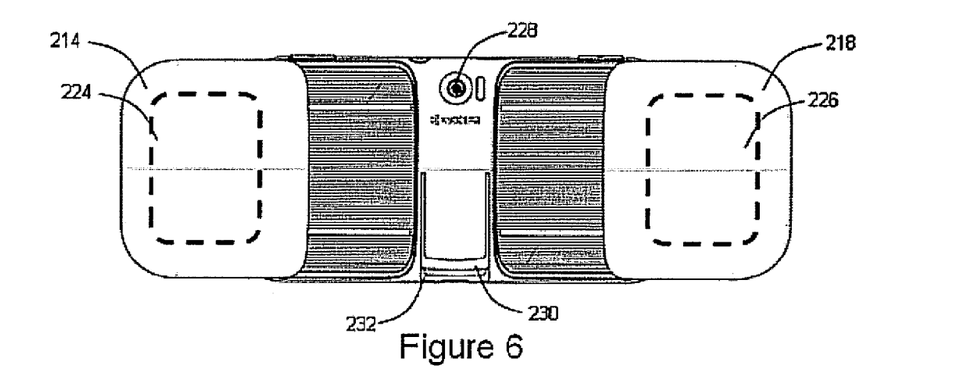
FIG. 6 shows a back view of the wireless device with the split keyboard withdrawn.

Referring to FIG. 6 there is shown a view of the bottom face with the split keyboard withdrawn, thereby displaying the first retractable keyboard 214 and the second retractable keyboard 218. Additionally, the dotted lines within the first retractable keyboard 214 represent a first battery 224 that is housed by the first retractable keyboard. Correspondingly, the dotted lines inside the second retractable keyboard 218 represent a second battery 226 that is also housed by the second retractable keyboard 218. In the illustrative embodiment, the first battery 224 and the second battery 226 weigh substantially the same. The batteries are relatively dense and by placing the batteries on each retractable keyboard, a substantial portion of the wireless handset is held comfortably in each hand. Additionally, when the retractable keyboard 214 and 218 are drawn out, the retractable keyboard and combined battery pack are each held by the user's palm or fingers in a balanced manner that makes it easier for the user to manipulate the keys.

In another embodiment, the wireless device is balanced by having the first retractable keyboard 214 weigh substantially the same as the second retractable keyboard 218. In this alternative embodiment, the mass or weight of the retractable keyboards are similar so that one retractable keyboard may have a single battery and the other retractable keyboard may house the electronics or other additional mass so that each retractable keyboard weighs approximately the same and the wireless device remains balanced as in the embodiment with each retractable keyboard having a battery.

An illustrative second camera 228 located on the bottom face of the balanced wireless device is also shown in FIG. 6. The illustrative second camera 228 is configured to take pictures and videos. When the wireless device is in camera mode or movie mode, the second camera 228 captures the images or video, respectively. The display 204 on the opposing top face 202 operates as a viewfinder during the image or video capture process. During the display image or display movie mode, the display 204 presents the captured pictures or videos.

The bottom face of the wireless device also includes a retractable arm 230 that pivots away from the bottom face. The retractable arm 230 or "kickstand" props up the balanced wireless device when the rectangular display is in the landscape display mode. The bottom face view of the retractable arm 230 is presented in FIG. 6 and a side view of the retractable arm 230 is presented in FIG. 5. Adjacent to the retractable arm 230 is a slot cover 232 (see FIG. 6) that covers a slot that is configured to receive a memory card (not shown), SIM card, or other such card. The memory card can be used to store data files, music files, movie files, game programs and other such files.

Figure 7:
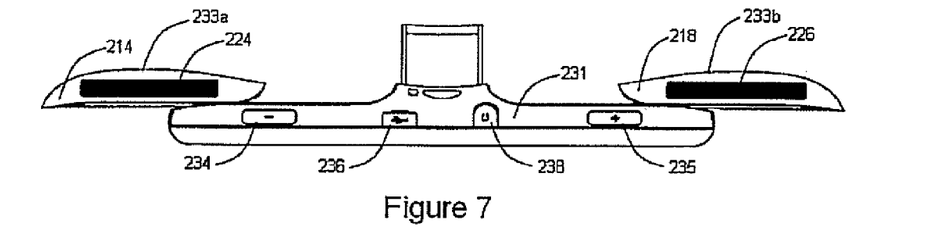
FIG. 7 shows a top side view of the illustrative wireless device.

FIG. 7 shows a top side 231 of the illustrative wireless device with the kickstand extended. The first retractable keyboard 214 houses battery 224 and includes an arcuate bottom edge or curved bottom 233a that is configured to interface with a user's hand and enables the user to more easily grip the retractable keyboard. The second retractable keyboard 218 houses a separate battery 226, but includes a similar curved bottom 233b having a similar arcuate bottom edge as curved bottom 233a. Each retractable keyboard is held by the user's hand and the curved bottoms provide an ergonomic design that allows the user to easily control each keyboard. Additionally, the even weight distribution of keyboard provides a balanced split QWERTY keyboard in landscape display mode.

Additionally, the top side 231 of the wireless device includes a first toggle switch 234 on the left side of the balanced wireless device and a second toggle switch 235 on the right side of the balanced wireless device. The toggle switches 234 and 235 operate in a manner similar to a game controller and may be controlled by a player's index fingers.

The top side 231 also includes an illustrative Universal Serial Bus (USB) port that allows peripherals to connect to the wireless device 12 such as a mouse, keyboard, joysticks, digital cameras, printers, media players, flash drives, and other such peripheral devices. Furthermore, the top side 231 also includes a jack 238 for headphones, microphones, or a combination thereof.

Figure 8:
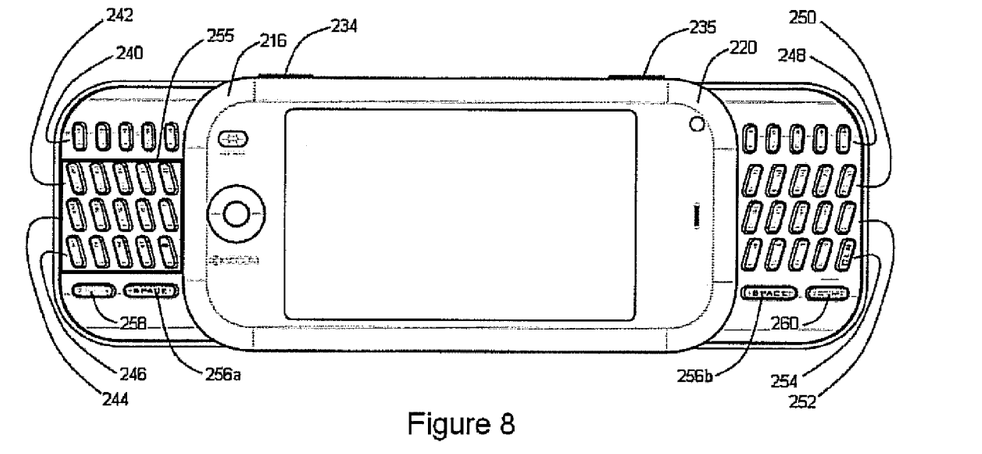
FIG. 8 presents an exploded view of the retractable keyboards of the wireless device.

Referring to FIG. 8 there is shown an exploded view of the retractable keyboards of the wireless device. The illustrative QWERTY key configuration for each retractable keyboard is described herein. On the first retractable keyboard 214 (on the left side) there is a first row 240 having five keys that correspond to numbers 1, 2, 3, 4, 5 and symbols !, @, #, $, %, respectively. The second row 242 is associated with letters Q, W, E, R, and T. The third row 244 includes the five keys corresponding to letters A, S, D, F and G. The fourth row 246 is composed of letters Z, X, C, V and B.

On the second retractable keyboard 218, the first row 248 includes five keys corresponding to number 6, 7, 8, 9, 0 and ^, &, *, (left parentheses), (right parentheses), respectively. The second row 250 is associated with Y, U, I, O and P. The third row 252 includes H, J, K, L, and (semicolon). The fourth row 254 is composed of N, M, (comma), (period), and (forward slash). Each retractable keyboard has a space bar 256a and 256b. The symbol key 260 can be used to distinguish between upper case and lower case letters, and to distinguish between symbols and numbers.

Additionally, the keys on the first retractable keyboard 214 can also be configured to operate as a numeric keypad as shown in block 255 and have the traditional numeric mobile phone keypad with the green "calling" key on the top left and the red "call end" key on the top right and the rows underneath have keys arranged as 123, 456, 789, and *0#. The numeric keypad may be enabled by pressing illustrative numeric keypad button 258.

Figure 9:
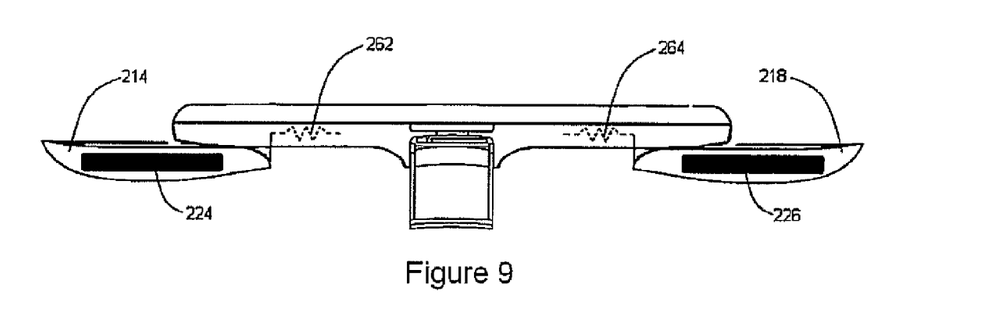
FIG. 9 shows a bottom side view of the illustrative wireless device.

Referring to FIG. 9 there is shown a bottom side view of the illustrative wireless device. In this second position, the first retractable keyboard and the second retractable keyboard extend beyond the display so that a plurality of first keys and second keys are accessible to the user. In FIG. 9 a first spring 262 that corresponds to the first retractable keyboard 214 includes a spring bias that is overcome to move the retractable keyboard 214 from the exposed keyboard position to the retracted keyboard position and vice versa. Additionally, a second spring 264 is shown that is associated with the second retractable keyboard 218 that also includes a spring bias similar to spring 262, wherein the spring bias has to again be overcome to move the retractable keyboard 218 from the first position to the second position and vice versa.

The springs 262 and 264 enable the retractable keyboards to be quickly opened and closed. In the illustrative embodiment, the spring assisted keyboards enable the user to open the split keyboard in one quick and simple action. The spring assisted action may include pressing retractable keyboard 214 and 218 towards one another to release and withdraw the keyboards, and the same action can be used to retract the keyboards.

The device and systems show a balanced split QWERTY keyboard with a dual battery back combination disposed on the bottom face or base portion of the illustrative portable device, i.e. a wireless handset. The first retractable keyboard and the second retractable keyboard are held comfortably by the user because when the keyboards are withdrawn they weigh substantially the same; thereby providing a balanced portable device. In the illustrative embodiment, each half of the split QWERTY keyboard has a corresponding battery pack that weighs substantially the same. The device provides a physical QWERTY keyboard that can be used for responding to e-mail and text messages as well as performing desktop applications such as typing, gaming, and web browsing.

It is to be understood that the detailed description of illustrative embodiments is provided for illustrative purposes. The scope of the claims is not limited to these specific embodiments or examples. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A balanced portable device comprising:
a rectangular housing having a top face and a bottom face;
a rectangular display on the top face; and
a split keyboard configured to receive input that is shown on the rectangular display, the split keyboard comprising,
a first retractable keyboard on a first end of the bottom face, wherein the first keyboard includes a first battery;
a second retractable keyboard on an opposing end of the bottom face, wherein the second keyboard includes a second battery;
the first retractable keyboard and the second retractable keyboard configured to substantially weigh the same;
wherein the first keyboard comprises a first curved bottom configured to be received by a first hand and the second keyboard comprises a second curved bottom configured to be received by a second hand.

2. The balanced portable device of claim 1 wherein the first battery and second battery are approximately the same weight.

3. The balanced portable device of claim 1 wherein the housing comprises a top side that includes a first toggle switch on one side of the balanced portable device and a second toggle switch on the opposite side of the balanced portable device.

4. The balanced portable device of claim 1 wherein the rectangular display comprises a touch screen display that is configured to operate in a landscape display mode and a portrait display mode.

5. The balanced portable device of claim 1 wherein the bottom face of the rectangular housing includes a retractable arm that pivots away from the bottom face, wherein the retractable arm is configured to prop up the balanced portable device when the rectangular display is in the landscape display mode.

6. The balanced portable device of claim 5 further comprising a slot adjacent to the retractable arm, the slot configured to receive a memory card.

7. The balanced portable device of claim 1 further comprising a navigation key on the top face and adjacent to the display, wherein the navigation key is configured to move a cursor up, down, left and right.

8. The balanced portable device of claim 1 further comprising at least one speaker disposed on at least one side of the balanced portable device.

9. The balanced portable device of claim 1 further comprising a first camera located on the top face of the balanced portable device, wherein the first camera is configured to operate with a video conferencing application.

10. The balanced portable device of claim 9 further comprising a second camera located on the bottom face of the balanced portable device, wherein the second camera is configured to enable the display on the top face to operate as a viewfinder.

11. The balanced portable device of claim 1 wherein the retractable first keyboard and the retractable second keyboard slidably interface with the housing and are configured to be placed in a first position and a second position.

12. The balanced portable device of claim 11 wherein the first position comprises the first retractable keyboard and the second retractable keyboard is disposed behind the rectangular display.

13. The balanced portable device of claim 12 wherein the second position further comprises the first retractable keyboard extending beyond the display so that a plurality of first keys are accessible and the second retractable keyboard extending beyond the display so that a plurality of second keys are also accessible.

14. The balanced portable device of claim 13 further comprising a spring corresponding to each retractable keyboard, wherein the spring has a spring bias that is overcome to move each retractable keyboard from the first position to the second position.

15. The balanced portable device of claim 13 wherein the first keyboard comprises a plurality of alphanumeric keys that perform as alphabetical keys for typing text and as numeric keys for keying in numbers and the second keyboard comprises alphabetical keys.

16. A balanced portable device comprising:
a rectangular housing having a top face and a bottom face;
a rectangular display on the top face;
a split keyboard configured to receive input that is shown on the rectangular display, the split keyboard comprising,
a first retractable keyboard on a first end of the bottom face, wherein the first keyboard includes a first battery;
a second retractable keyboard on an opposing end of the bottom face, wherein the second keyboard includes a second battery;
the first retractable keyboard and the second retractable keyboard configured to substantially weigh the same;
wherein the first keyboard comprises a first curved bottom configured to be received by a first hand and the second keyboard comprises a second curved bottom configured to be received by a second hand;
a first position where the first retractable keyboard and the second retractable keyboard are disposed behind the rectangular display;
a second position where the first retractable keyboard extends beyond the display so that a plurality of first keys are accessible and the second retractable keyboard extends beyond the display so that a plurality of second keys are also accessible; and
a spring corresponding to each retractable keyboard, wherein a spring bias is overcome to move each retractable keyboard from one position to another position.

17. The balanced portable device of claim 16 wherein the first battery and second battery are approximately the same weight.

18. The balanced portable device of claim 16 wherein the housing comprises a top side that includes a first toggle switch on one side of the balanced portable device and a second toggle switch on the opposite side of the balanced portable device.

19. The balanced portable device of claim 18 wherein the bottom face of the rectangular housing includes a retractable arm that pivots away from the bottom face, wherein the retractable arm is configured to prop up the balanced portable device when the rectangular display is in the landscape display mode.

20. The balanced portable device of claim 19 further comprising a navigation key on the top face and adjacent to the display, wherein the navigation key is configured to move a cursor up, down, left and right.

21. The balanced portable device of claim 20 further comprising a first camera located on the top face of the balanced portable device, wherein the first camera is configured to operate with a video conferencing application.

22. The balanced portable device of claim 21 further comprising a second camera located on the bottom face of the balanced portable device, wherein the second camera is configured to enable the display on the top face to operate as a viewfinder.

23. A wireless handset system comprising:
a rectangular display on a top face of the wireless handset, the rectangular display comprises a touch screen display that is configured to operate in a landscape display mode and a portrait display mode;
a split keyboard on a bottom face of the wireless handset, the split keyboard comprising,
a first retractable keyboard on a first end of the bottom face, wherein the first keyboard includes a first battery;
a second retractable keyboard on an opposing end of the bottom face, wherein the second keyboard includes a second battery;
the first retractable keyboard and the second retractable keyboard configured to substantially weigh the same;
wherein the first keyboard comprises a first curved bottom configured to be received by a first hand and the second keyboard comprises a second curved bottom configured to be received by a second hand;
a first position where the first retractable keyboard and the second retractable keyboard are disposed behind the rectangular display in the portrait display mode;
a second position where the first retractable keyboard extends beyond the display so that a plurality of first keys are accessible and the second retractable keyboard extends beyond the display so that a plurality of second keys are also accessible, wherein the rectangular display in the second position corresponds to a landscape display mode; and
a spring corresponding to each retractable keyboard, wherein a spring bias is overcome to move each retractable keyboard from one position to another position.

24. The wireless handset system of claim 23, wherein the wireless handset in the first position having a portrait display mode is configured to operate in a voice mode, wherein the touch screen display provides a graphical user interface with a numeric keypad that receives a numeric input.

25. The wireless handset system of claim 23, wherein the wireless handset in the second position having a landscape display mode is configured to operate in a voice mode and one of the retractable keyboards includes a plurality of numeric keys that receive a numeric input.

26. The wireless handset system of claim 23 wherein the wireless handset in the second position having a landscape display mode is configured to operate in a video mode, in which audio visual media is shown on the display.

27. The wireless handset of system of claim 23 wherein the wireless handset in video mode is configured to receive a text message and respond to the text message using the retractable keyboards.

* * * * *